United States Patent
Doi et al.

(10) Patent No.: US 8,413,035 B2
(45) Date of Patent: Apr. 2, 2013

(54) POWER CONTROL APPARATUS AND METHOD FOR REALIZING EFFICIENT LOAD FACTOR WITH LOWER CONTRACTED POWER LIMIT

(75) Inventors: Yusuke Doi, Yokohama (JP); Keiichi Teramoto, Tokyo (JP); Yoshiki Terashima, Yokohama (JP); Yasuyuki Nishibayashi, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 13/218,048

(22) Filed: Aug. 25, 2011

(65) Prior Publication Data

US 2012/0043813 A1    Feb. 23, 2012

Related U.S. Application Data

(63) Continuation of application No. PCT/JP2010/053131, filed on Feb. 26, 2010.

(30) Foreign Application Priority Data

Feb. 27, 2009   (JP) ................. 2009-045933

(51) Int. Cl.
    *H03M 13/00*    (2006.01)
(52) U.S. Cl. ........................ 714/799; 700/297
(58) Field of Classification Search ............ 714/799; 700/209, 297
    See application file for complete search history.

(56) References Cited

U.S. PATENT DOCUMENTS

| 5,272,382 | A  | * | 12/1993 | Heald et al. ........... 307/66 |
| 5,283,905 | A  | * | 2/1994  | Saadeh et al. ........ 713/324 |
| 6,339,340 | B1 | * | 1/2002  | Hsu .............. 324/764.01 |
| 7,484,110 | B2 | * | 1/2009  | Stufflebeam .......... 713/300 |
| 7,529,948 | B2 | * | 5/2009  | Conroy et al. ......... 713/300 |
| 7,802,120 | B2 | * | 9/2010  | Conroy et al. ......... 713/340 |
| 7,865,272 | B2 | * | 1/2011  | Spitaels et al. ........ 700/299 |
| 7,888,919 | B2 | * | 2/2011  | Dishman et al. ....... 323/266 |
| 8,140,195 | B2 | * | 3/2012  | Matteson et al. ....... 700/299 |

FOREIGN PATENT DOCUMENTS

| JP | 10-094170 A   | 4/1998  |
| JP | 2001-069668 A | 3/2001  |
| JP | 2002-369383 A | 12/2002 |
| JP | 2008-092680 A | 4/2008  |
| JP | 2009-507340 A | 2/2009  |

OTHER PUBLICATIONS

International Search Report and Written Opinion dated May 18, 2010 from PCT/JP2010/053131.

* cited by examiner

*Primary Examiner* — Esaw Abraham
(74) *Attorney, Agent, or Firm* — Ohlandt, Greeley, Ruggiero & Perle, L.L.P.

(57) ABSTRACT

A power control apparatus is provided that includes a calculation unit, a detection unit, a storage unit, a selection unit and an execution unit. The detection unit detects whether a required spare capacity is short, based on the required spare capacity, the spare power, and the total spare power capacity. The storage unit stores power control operation items. The selection unit selects power control operation items if the required spare capacity is short. The execution unit executes application operation of one or more the power control operation items until the required spare capacity becomes available, and executes waiting operation of one or more power control operation items executing the application operation if the required spare capacity is available.

10 Claims, 4 Drawing Sheets

POWER CONTROL APPARATUS AND METHOD FOR REALIZING EFFICIENT LOAD FACTOR WITH LOWER CONTRACTED POWER LIMIT

CROSS REFERENCE TO RELATED APPLICATIONS

This application is a Continuation Application of PCT Application No. PCT/JP2010/053131, filed Feb. 26, 2010 and based upon and claiming the benefit of priority from prior Japanese Patent Application No. 2009-045933, filed Feb. 27, 2009, the entire contents of all of which are incorporated herein by reference.

FIELD

Embodiments described herein relate generally to a power control apparatus and method.

BACKGROUND

A technology exists whereby household appliances whose operation can be stopped are selected and operation stopped when power demand exceeds a predetermined level. The operation of each household appliance is adjusted on the basis of a power demand profile created according to operation programs for each appliance so that the power demand does not exceed the predetermined level (See e.g., JP-A. No. 2002-369383(KOKAI)).

DETAILED DESCRIPTION

With conventional power control methods, only rough control can be executed for household appliances which are not controllable via an external operation items such as a network. Such conventional methods cannot realize high convenience for users, such as reducing peak power demand to place a user's power supply requirements in a lower contracted power limit. For example, conventional methods cannot maintain power supply by the subsidiary circuit system (hereinafter, referred to as the "subsystem") of the user's home by controlling power demand so that it does not exceed a preset value when appliances (independent transient loads) which are not generally controllable via a network, but operate at high power for a short time, such as a hot plate or a dryer, are used. In particular, an assumed total value of loads is merely preset for imposition of such multiple independent transient loads, and a large power capacity is necessary for these loads. This makes it difficult to place the user in a lower contracted power limit.

In general, according to one embodiment, a power control apparatus includes a calculation unit, a detection unit, a storage unit, a first selection unit and an execution unit. The calculation unit is configured to calculate a spare power capacity for each subsystem based on a power demand and a maximum power capacity for each subsystem, and to calculate a total spare power capacity for an entire system based on a power demand for the entire system and a contracted power limit. The detection unit is configured to detect whether a required spare capacity is short, based on the required spare capacity and each subsystem's spare power capacity and the total spare power capacity, the required spare capacity indicating an estimated power demand of an uncontrollable device is available. The storage unit is configured to store a plurality of power control operation items which are to be applied to ensure the required spare capacity in order to prevent the required spare capacities for each subsystem and for the entire system from being short. The first selection unit is configured to select at least one of the plurality of power control operation items if the detection unit detects that the required spare capacity for each subsystem or for the entire system is short. The execution unit is configured to execute an application operation of at least one of the power control operation items until the required spare capacity becomes available, and to execute a waiting operation of at least one of power control operation items executing the application operation if the required spare capacity is available.

In the following, the power control apparatus and method according to the present embodiments will be described in details with reference to the drawings. In the embodiments described below, the same reference number will be used to denote similar-operation elements, and a repetitive description of such elements will be omitted.

(First Embodiment)

Figure 1:
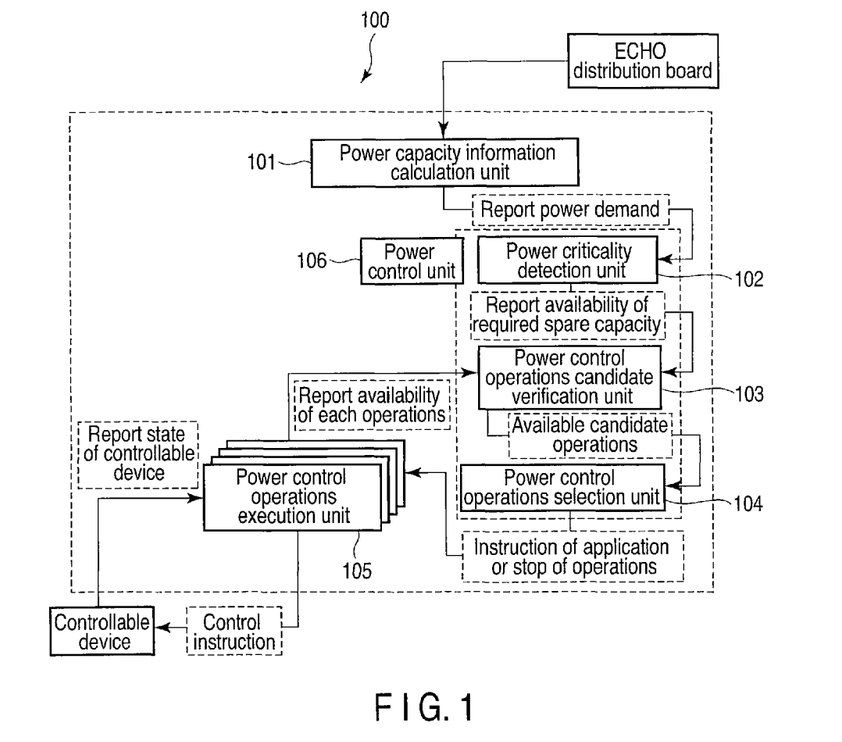
FIG. 1 is an exemplary block diagram illustrating a power control apparatus according to the first embodiment.

A power control apparatus according to the first embodiment is described with reference to FIG. 1.

A power control apparatus 100 according to the first embodiment includes a power capacity information calculation unit 101, a power criticality detection unit 102, a power control operation candidate verification unit 103, a power control operation items selection unit 104, and a power control operation execution unit 105. The power criticality detection unit 102, the power control operation candidate verification unit 103 and the power control operation items selection unit 104 are included in a power control unit 106. The power control apparatus 100 is connected to an externally provided distribution board which has a function of reporting the power capacity for each system (e.g., subsystem) and an externally provided control device which is capable of controlling power through ECHONET (registered trademark).

The power capacity information calculation unit 101 receives data on the present power demand and maximum power capacity for each subsystem from the externally provided distribution board, and receives a total present power demand of all subsystems and a contracted power limit. The maximum power demand for each subsystem and the contracted power limit for the entire system are stored in a device profile of the circuit breaker box (distribution board), and the stored data can be obtained by operation items of ECHONET (registered trademark), for example. This process is periodically performed (for example, every second). Spare power capacity is calculated for each subsystem (for example, by calculating the difference between the maximum power capacity and the present power demand) based on the received data on the present power demand and maximum power capacity for each subsystem, and the total spare power capacity for the entire system is calculated based on the power demand for all subsystems and the contracted power limit. In addition, the calculated spare power capacity for each subsystem and the total spare power capacity are reported to the power criticality detection unit 102. Each subsystem is identified by system ID used for the entire system.

The power criticality detection unit 102 defines a required spare capacity for each subsystem and for the entire system by constants or other techniques. The required spare capacity indicates the possible power demand for general independent transient loads, namely, an assumed maximum power demand for imposition of such independent transient loads. An independent transient load is a load which demands relatively high power for a short time, such as an iron, a heater, a hotplate, a dryer or a microwave oven. After the required spare capacities are determined, power criticality values for each subsystem and the entire system are calculated and reported to the power control operation items candidate verification unit 103. The power criticality value is obtained by subtracting the spare power capacity received from the power capacity information calculation unit 101 from the required spare capacity. If the power criticality value is zero, the spare power capacity is equal to the required spare capacity. In this case, if an additional power demand is made, the required spare capacity becomes unavailable. If the power criticality value is positive, the required spare capacity is unavailable; if negative, the required spare capacity is available.

The power control operation candidate verification unit 103 determines the availability of operation items for controlling electricity supply so that the power criticality value received from the power criticality detection unit 102 does not become positive; that is, it represents operation item for power control to secure the required spare capacity. For the determination, the power control operation candidate verification unit 103 acquires power control information item regarding each of a plurality of available power control operation items, the information item being stored in the power control operation execution unit 105, which will be explained later. The power control information item indicates data items described below. The power control information item may indicate a cost or requisites (condition of flag variables to be referred to) for operation of the apparatus.

State: This indicates that the power control operation item is applied and can be stopped ("applied"); the power control operation item is not applied but can be applied ("waiting"); or the power control operation item cannot be applied or stopped ("inoperable").

Application Priority: This indicates the priorities for applying the operation item when the power criticality occurs. Any numbers which are comparable can be used. In this embodiment, the scale of 1 (applied first) to 10 (applied after another operation items is applied) is used.

Waiting Priority: This indicates the priorities for stopping or waiting application of the operation item and supplying electricity (to devices which have been inactivated) when the required spare capacity is available. Any numbers which are comparable can be used. In this embodiment, the scale of 1 (stopped first) to 10 (stopped after another operation items is stopped) is used.

Reducible/re-operable power: This indicates the power which is reducible by application of the power control operation item, or the power which is to be demanded when stopping application of the operation item.

Applicable System: This indicates a specific subsystem with a system ID if the operation item is applicable to the specific subsystem.

Procedure Indicator: This defines the procedure for activating the power control operation execution unit 105 by the power control operation selection unit 104 if applying or stopping the operation item. The procedure indicator may be a pointer indicating a function or a WSDL on the web service.

The power control information item indicating the above data items is transmitted to the power control operation selection unit 104 along with the power criticality values for each subsystem and for the entire system received from the power criticality detection unit 102. Below are explanations for selection of power control information items.

If the power criticality value is negative, the power control information items for the operation items which have been applied and which have reducible/re-operable power below the absolute value of the power criticality value are sorted based on the waiting priority, and the sorted power control information items are sent to the power control operation selection unit 104.

If the power criticality value is positive, the power control information items for the power control operation items which have not been applied are sorted based on the application priority and sent to the power control operation selection unit 104.

If the power criticality value is negative, the power control operation selection unit 104 sends a waiting instruction to the power control operation execution unit 105 corresponding to the power control operation items having the highest waiting priority (the smallest value on the scale) of multiple power control operation items indicated by the power control information items received from the power control operation candidate verification unit 103. It may be possible to stop multiple power control operation items simultaneously unless the sum of the reducible/re-operable power amounts exceeds the absolute power criticality value. Since this process is repeatedly performed, even if one of the power control operation items is stopped in this step, the power control operation items are stopped in a short time in order of waiting priority, starting with the highest priority (the smallest value on the scale) unless the sum of the reducible/re-operable power amounts exceeds the absolute power criticality value.

If the power criticality value is positive, the power control operation selection unit 104 sends a waiting instruction to the power control operation execution unit 105 corresponding to the power control operation items which has the highest application priority (the smallest value on the scale). The waiting instruction is sequentially sent to the power control operation execution units 105 in order of application priority, starting with the highest priority. If high-cost operation item is selected, a process of reducing the cost from the budget in which a constant value is preset or a process of requesting authorization to a user can be rationally added. The method for executing the operations of multiple power control operation execution units 105 while requesting the user's authorization will be explained later with reference to FIG. 2.

The power control operation execution unit 105 stores a plurality of power control operation items and power control information items associated with the plurality of power control operation items, respectively. The power control operation execution unit 105 selects the most suitable power control operation items and executes processing of applying or waiting the power control operation items. The power control operation execution unit 105 also provides the power control information items to the power control operation candidate verification unit 103.

<Protection at the Time of Imposition of Independent Transient Loads>

In the present embodiment, three examples of protection will be explained. First, an operation of protection when independent transient loads are imposed will be explained. A possible domestic power outage is due to exceeding the contracted power limit by imposing multiple independent transient loads simultaneously.

Below are power control operation items to avoid such a power outage. First, a maximum power demand expected for the general independent transient loads is estimated, and the maximum power demand is stored in the power criticality detection unit 102 as a required spare capacity. Three power control operation items, power outlet with a protection function, warning function and load control, are defined as examples of simple and safe power control operation items.

A state transition for each power control operation item is described as "before state transition→after state transition: condition for state transition/operation along with state transition."

[Power Outlet with Protection Function]

Each socket of the power outlet with the protection function has a sensor detecting whether a plug has been inserted, a power use measure, and a power block function which is independently controllable. If the power is not demanded for a certain time (for example, fifteen minutes), or it is determined that nothing is plugged into the socket, the socket is determined not to be in use. At the time of power criticality (the power criticality value is positive), power consumption by a new independent transient load is prevented by blocking power supply and disabling all sockets which are not used. The power control information item for this operation item indicates the following:

State: There are two possible state transitions.

Wait→Applied Block of power supply is instructed/Power supply to unused sockets is blocked Applied→Wait: Resupply of power is instructed/Power supply to blocked sockets is restarted Application Priority: 1

Apply this operation item first, and power criticality is overcome by using another operation items.

Waiting Priority: 1

Stop applying this operation item first when power criticality ceases. (No power control is applied, and the sockets are usable.)

Reducible/re-operable power: 0

No operation for changing the power demand is made.

[Warning Function]

The warning function is to warn the user (householder) of power criticality by using a sound or a caption on a TV. The power control information item for this operation item indicates the following:

State: The following two possible state transitions are the simplest examples. Warnings are provided every two minutes at the time of power criticality.

Wait→Inoperable: Warnings are provided/No operation is performed for a certain time (to prevent too many warnings)

Inoperable→Wait: A certain time lapsed (for example, two minutes)/No operation is performed for a certain time Application Priority: 4

If easily applicable operation item is not available, warn the user.

Waiting Priority: N/A

Waiting priority is not applicable since there is no necessity to stop application. (In turn, there is no state "Applied".)

Reducible/re-operable power: 0

No operation for changing the power demand is made.

[Load Control]

The power supply to a controllable device whose operations can be stopped without sacrificing user's convenience such as an air conditioner is stopped. The power control information item for this operation item indicates the following:

State: State transits in accordance with the operational state of device.

Wait→Applied: Operation of the device is stopped by applying this power control operation item.

Applied→Wait: Operation of the device is restarted by resupplying power.

Applied→Inoperable: Operation of the device is stopped by the user or a timer.

Inoperable→Applied: Operation of the device is started by the user or a timer.

Application Priority: 7

Applied after the other applicable control operation items are applied at no cost.

Waiting Priority: 2

Wait as soon as possible since this operation item greatly affects the user or the environment.

Reducible/re-operable power: (In operation) The power demand for the present operation mode/(In non-operation) The power to be demanded when the power is turned on.

Figure 2:
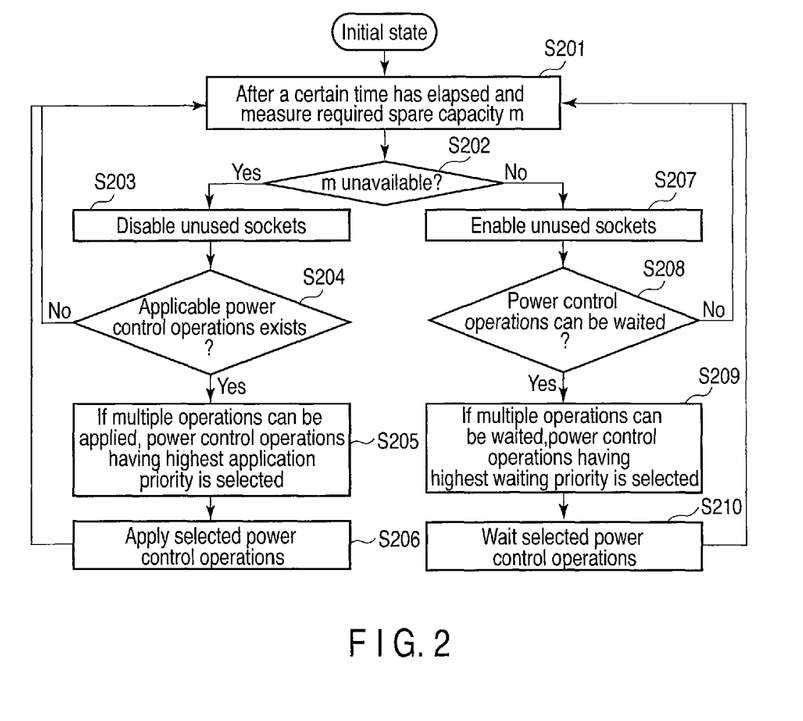
FIG. 2 is an exemplary flowchart illustrating the operation using the power outlet with a protection function.

The process for the case where power criticality occurs by imposing an independent transient load is explained in detail by using the flowchart of FIG. 2.

First, the power capacity information calculation unit 101 acquires power information (for example, the power demand) every second from the distribution board, or gathers separately received data on power for each second. The power capacity information calculation unit 101 calculates the power demand for each subsystem and for the entire system, and notifies the power demand to the power criticality detection unit 102.

The power criticality detection unit 102 compares the notified amounts of present power demand with the maximum power capacity for each subsystem and with the contracted power limit for the entire system obtained by the device profile of the distribution board, and calculates the spare power capacity for each subsystem. The spare power capacity is compared with the predetermined required spare capacity m (m is an integer) to calculate the power criticality value (S201, S202). The formula for calculating the power criticality value is as follows:

$$\text{Power criticality value} = \text{Required spare capacity} - \text{Spare power capacity}$$

For example, when a load of 1300 W is imposed on the subsystem having a rated power of 1500 W, and the required spare capacity m is 400 W, the power criticality value is 400−(1500−1300)=200. In this case, since the power criticality value is positive, and the required spare capacity m is unavailable, if an independent transient load is imposed, a power outage may occur unless the power demand of 200 W is reduced. The power criticality detection unit 102 transmits the power criticality value which is 200 to the power control operation candidate verification unit 103. If the states of the power outlet with the protection function, warning function and load control are waiting, all power control operation items are available, and owing to the required spare capacity m is short, the power control information items for the power outlet with the protection function, the warning function and the load control are transmitted to the power control operation selection unit 104.

The power control operation selection unit 104 which has received the power control information items instructs application of the power control operation items. The power outlet with the protection function having the highest application priority, "1," is applied to disable the unused socket (S203). By this application, an unconnected or unused independent transient load cannot be imposed, and power outage is prevented.

Next, it is determined whether or not applicable power control operation items are available (S204). If applicable power control operation items are not available, S201 is returned to in order to calculate the power criticality value after a certain time has elapsed at the power capacity information calculation unit 101. If applicable power control operation items are available, S205 is executed. In S205, if multiple power control operation items are available, one power control operation items having the highest application priority (having the smallest value on the scale) is selected. In S206, the selected power control operation item is applied, and the process is returned to S201 in order to measure the required spare capacity again.

It is assumed that the power demand does not change in the next cycle of the power capacity information calculation unit 101. In this case, the power criticality detection unit 102 calculates the power criticality value as still 200 (S201, S202). Since the power outlet with the protection function has been applied, the power control operation candidate verification unit 103 transmits power control information items on the warning function and the load control to the power control operation selection unit 104, and the power control operation candidate verification unit 103 determines whether applicable power control operation items are available (S204). In this cycle, the power control operation selection unit 104 activates the warning function based on the application priority (the application priority of the warning function is 1, whereas that of the load control is 7), the process is returned to S201 (S205, S206).

In the next cycle, only the load control is available (in the waiting state). If the power criticality is not recovered from, the load control is applied (S201 to S206). It is assumed that the operation of an air conditioner which is a controllable device is temporarily stopped to lower the power demand, and the power demand of 500 W is reduced. In S201 of the following cycle, the required spare capacity m is measured in the same way as S201 of the former cycle. Since the load is 1300−500=800, the power criticality value is 400−(1500−800)=−300. If the power criticality value is negative, because the required spare capacity m is not short in S202, the process determines that the required spare capacity is available, and S207 is executed.

The power control operation candidate verification unit 103 was informed that the power criticality value is negative, and power control information item(s) on the power control operation item(s) that can be stopped, i.e., the power control operation items whose state is applied, and the reducible/re-operable power is lower than the absolute value of the power criticality value is transmitted to the power control operation selection unit 104. In this case, the power outlet with the protection function having the highest waiting priority is stopped. The power supply for the unused sockets is restarted, and an additional load can be imposed (S207). The reducible/re-operable power of the load control is 500 W, which is greater than the absolute value of the power criticality, −300 (|−300|<500) (|x| indicates the absolute value of x). In light of the waiting priority, the load control is continuously applied until the required spare capacity becomes available by the other operation items.

Next, it is determined whether further power control operation items can be stopped (S208). If no power control operation items can be stopped, S201 is returned to in order to repeat the above process. If power control operation items which can be stopped exist, S209 is executed. If multiple power control operation items can be stopped, one power control operation item having the highest waiting priority is selected (S209, S210). The user can reduce power demand by stopping a device which demands high power by using the "warning function." In S210, the selected power control operation items are stopped, and the process is returned to S201 in order to measure the required spare capacity again after a certain time lapses.

Then, the power criticality detection unit 102 calculates the power criticality value and confirms that the power criticality value is negative. For example, if the user is using an independent transient load such as a toaster, the operation of the toaster is stopped to ensure the required spare capacity. When the power criticality value falls below −500, the operation of the air conditioner can be restarted. Then, the process of power control according to this embodiment is completed.

In the above process, power control is executed based on the application priority and waiting priority. The object of the process is to apply the "power outlet with a protection function" to prevent imposition of unexpected load from the presently unused socket, and then, to apply the other power control operation items so as to ensure the required spare capacity.

<Control of Protection Function for Each Subsystem>

The above-described controls are performed for each individual subsystem and for the entire system. For the general subsystems, since a rated current of 10 to 15 A (1000 to 1500 W) is assigned for each subsystem, if loads are concentrated on certain sockets, the power outage may occur. Thus, it is necessary to indicate which power control operation items are applicable to which subsystem. To indicate it, the power control information item for each power control operation item may indicate a value designating an applicable system. In this case, the power control operation candidate verification unit 103 selects the power control operation items which can be applied or can be waiting relative to power criticality values for each subsystem. The selection is made that the power control operation items whose applicable system is identical to the system ID of the power criticality value for each subsystem is selected. Since the power control to the entire system can be applied to any individual subsystems, the power control operation items to overcome the power criticality relative to the contracted power limit can be selected without considering applicability to each subsystem.

If a warning or the like is provided to the user for each subsystem, power control information item for each subsystem can be prepared. If a warning relative to the contracted power limit should be provided to the entire system, an exclusive control is necessary so as not to apply the warning for each subsystem. For example, the application priority of warning relative to the entire system should be higher than that of warning for each subsystem, and if the warning is applied to the entire system, the state of the power control operation items for providing a warning relative to each subsystem is automatically turned to "inoperable."

<Accumulative Load Control>

In this embodiment, a load of a high-capacity charger for rapidly charging a high-energy battery such as an electric car is called an accumulative load. For this kind of load, a mode switch for switching modes between "economical charging," "normal charging" and a "rapid charging" may be provided, and power demand varies depending on the mode. As an example of this embodiment, it is explained that a large power supply is possible with safety to multiple accumulative loads acquiring data on power independently from the distribution board and continuously using power by the load control.

An example of the accumulative load which is an apparatus having a rapid charging battery (for example, an electric car) will be explained below. This example is applicable to the case where multiple accumulative loads are used.

The accumulative load has power control information items corresponding to each of the "economical charging mode," "normal charging mode" and "rapid charging mode," and the power control information item in accordance with the mode is transmitted to the power control operation selection unit 104.

[Economical Charging Mode]

This mode is a usual charging mode which uses an off-peak power. In the example indicated below, charging is stopped when the time for using the off-peak power ends; however, it is possible to continue charging until charging is completed.

State: This mode is activated only during the time for using the off-peak power.

Inoperable→Wait: The charging battery is plugged in, and the off-peak power can be used/Charging starts Wait→Applied: Pausing charging is instructed by power control/Charging stops Applied→Wait: Power control to pause charging is stopped/Charging restarts Wait→Inoperable: Charging is completed, or the charging battery is unplugged/Charging stops Applied→Inoperable: The time for using the off-peak power ends, or the charging battery is unplugged/Charging stops Application Priority: 1
Applied before a warning.
Waiting Priority: 6
Wait only when the power demand is stable.
Reducible/re-operable power: Constant The battery is charged with a lower power for a longer time (for example, two to six hours) to extend the battery life.

[Normal Charging Mode]

This mode is used for the case where the battery should be charged in the daytime.

State:

Inoperable→Wait: The charging battery is plugged in/Charging starts

Wait→Applied: Pausing charging is instructed by power control/Charging stops

Applied→Wait: Power control to pause charging is stopped/Charging restarts

Wait→Inoperable: Charging is completed, or the charging battery is unplugged/Charging stops Applied→Inoperable: The charging battery is unplugged/Charging stops Application Priority: 1
Applied before a warning. For the cases where the electric car is frequently used, for example, in an office or a sales branch, the application priority can be 4 to provide a warning.

Waiting Priority: 6
Wait only when the power demand is stable.
Reducible/re-operable power: Constant The battery is charged with a relatively lower power for a longer time (for example, one to two hours) to extend the battery life.

[Rapid Charging Mode]

For this mode, charging power is ensured by applying the load control.

State:

Inoperable→Wait: The charging battery is plugged in/Charging starts

Wait→Applied: Power control to reduce the amount of charging is applied/Charging stops for one step of a full charge Applied→Wait: Power control is stopped/Charging restarts Wait→Inoperable: Charging is completed, or the charging battery is unplugged/Charging stops Applied→Inoperable: The charging battery is unplugged/Charging stops Application Priority: 8
Applied after applying the load control
Waiting Priority: 1
Stopped first when power is available for charging.
Reducible/re-operable power: Amount for one step The economical charging mode and the normal charging mode are substantially the same as each other except that the state autonomically transitions over time in the economical charging mode. On the other hand, the rapid charging mode is different from the other modes in that the presently available power is acquired by monitoring the distribution board.

In rapid charging mode, the power required for a full charge is divided into steps, and the battery charges a step at a time, power control information item being provided for each step. For example, a charger rated at 3000 W can be controlled in six equal 500-W steps by providing the power control operation candidate verification unit 103 with identical power control information item for each step. This allows the charging power to be adjusted in 500-W increments up to the maximum, instead of fully charging at a time or not charging. In this mode, since the application priority of the rapid charging mode is lower than that of the load control, the power can be used for charging by applying the load control by the following process:

1. Accumulative load: The power is determined based on the power capacity obtained from the distribution board right before charging starts.

2. Accumulative load: The power criticality occurs due to start of charging. (The power criticality value becomes positive.)

3. Power control: Power supply to sockets is stopped because of power criticality. Power control is activated after warning.

4. The spare power capacity increases by the load control.

5. Accumulative load: The accumulative load detects increase of the spare power capacity by checking with the distribution board.

6. Accumulative load: Increased spare power capacity is secured for charging.

To realize more flexible control, two kinds of power control information items can be utilized simultaneously for one accumulative load. In this case, different application priorities are assigned to respective power control information items. One of the power control information items is for the case where the power used for charging is fixed (same as the normal charging mode), and another is for the case where the power used for charging is variable to effectively use the spare power (same as the rapid charging mode). The power control information items can be selectively used in accordance with the power criticality.

<Securing Required Spare Capacity by External Resource Reservation>

There is a case where a shared emergency electric generator, photovoltaic system, aerogenerator, or a connected battery or capacitor are available as an external power source in addition to the contracted (commercial) electricity. However, such external power sources are generally limited and costly, and they cannot freely be used.

However, if the power control information item on the external power source is set as indicated below, the external power source can be automatically used only when the power criticality is not overcome by the above-mentioned power control operation items.

State:

Inoperable→Wait: The external power source becomes available/No operation is performed Wait→Applied: Use of the external power source is instructed/Use of the external power source starts Applied→Wait: Stop using the external power source is instructed/Use of the external power source stops Applied→Inoperable: The external power source is unavailable for some reasons/Use of the external power source stops Wait→Inoperable: The external power source is unavailable for some reasons/Use of the external power source stops Application Priority: 10

Applied as the last operation items when the power criticality cannot be overcome within the subsystem.

Waiting Priority: 1

Applied for the shortest time as possible.

Reducible/re-operable power: Constant

The rated amount which can be supplied is indicated.

The automatic use of external power source which is costly may be undesirable for the users. To avoid this undesirable use, the external power source may be activated for a certain time upon the users' authorization by operation items of a user interface or a physical switch, or may be activated within a predetermined monthly budget and inactivated when exceeding the budget. The above application options for the external power source can be combined for users' convenience.

According to the aforementioned first embodiment, the demand side management which prevents power outage and serves the convenience of users can be provided by applying the most suitable power control operation items to reduce the power demand or using the external power source, based on calculation of the power criticality value by obtaining the power demand at a certain intervals, in the case where imposition of independent transient loads which cannot be controlled is expected. This realizes an efficient load factor with a lower contracted power limit.

(Second Embodiment)

<Required Spare Capacity Estimation>

This embodiment is different from the first embodiment which supposes the fixed required spare capacity in that the required spare capacity is dynamically determined by monitoring. Since the required spare capacity should be equal to the maximum power demand (ampere or watt) of an uncontrollable independent transient load, if a distribution board can obtain data on power demand within the subsystem, the power demand of an independent transient load can be obtained unless multiple independent transient loads are imposed simultaneously. This is because the power demand of device imposed for each subsystem can be acquired by monitoring change in power demand of the distribution board over time at an appropriate intervals (longer than the time from when a general independent transient load is switched on to when power consumption starts, and enough for obtaining change in power demand of a single load, e.g., 20 seconds to 1 minute).

For example, a subsystem for an air conditioner is usually independent. The maximum change in power demand obtained from the distribution board (increase, decrease or both) which is not due to the power control operation of the present embodiment or the other control operation is assumed to be the maximum load of the independent transient load (hereinafter, referred to as "maximum power displacement"), and the required spare capacity is determined by multiplying the maximum power displacement by the safety factor (e.g., a constant of 1.2).

The power control apparatus according to this embodiment will be explained with reference to FIG. 3.

Figure 3:
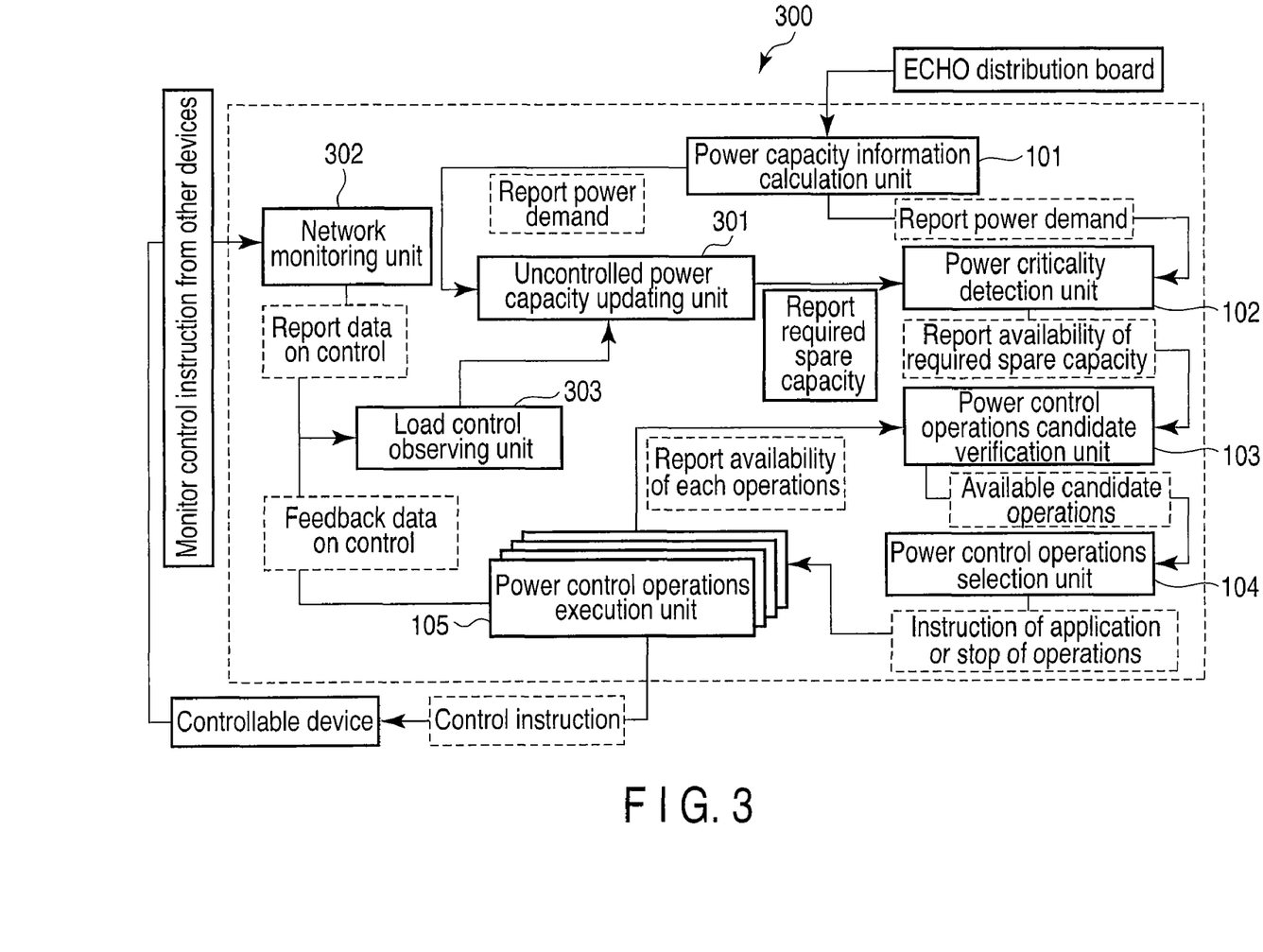
FIG. 3 is an exemplary block diagram illustrating a power control apparatus according to the second embodiment.

FIG. 3 shows a process of dynamically calculating the required spare capacity in a power criticality detection unit 102.

A power control apparatus 300 according to this embodiment includes an uncontrolled power capacity updating unit 301, a network monitoring unit 302, and a load control observing unit 303 in addition to a power control apparatus 100 of the first embodiment.

The units carry out the same operations as those of the first embodiment, and explanations are omitted.

The uncontrolled power capacity updating unit 301 receives the power demand for each subsystem at the aforementioned certain time intervals from the distribution board through a power capacity information calculation unit 101, records the maximum power displacement, and sends the maximum power displacement to the power criticality detection unit 102 as the required spare capacity for each subsystem. In addition, the uncontrolled power capacity updating unit 301 receives control report from the load control observing unit 303, which will be described later. Based on the received control report, the required spare capacity for the entire subsystem is calculated and updated if required to provide the maximum required spare capacity for each subsystem to the power criticality detection unit 102.

The network monitoring unit 302 monitors control instructions provided to controllable devices, and if the controllable devices are controlled, the network monitoring unit 302 informs the load control observing unit 303 of control report indicating that the devices are controlled.

The load control observing unit 303 receives the control report from the network monitoring unit 302 and feedback on the control report from a power control operation execution unit 105, and sends them to the uncontrolled power capacity updating unit 301.

If data on intervals at which power control operation items is activated by the power control operation execution unit 105, and a network message regarding the power control (i.e., whether the UPnP (registered trademark)/ECHONET (registered trademark) device is connected or separated, or switched on or blocked) are observed, the maximum power displacement is not exceptionally recorded. In such a case, since the power demand increases due to activation of the control device connected to the network, the required spare capacity is not updated. For this operation, a power control flag is prepared in the load control observing unit 303, and the network monitoring unit 302 monitors the network message regarding power control, and sets the power control flag of the corresponding subsystem if the message is observed. If power control operation item which is capable of actually changing the power demand is applied, the power control flag of the corresponding subsystem is set. If the corresponding subsystem is unknown, the power control flag corresponding to all subsystems is set.

Then, the uncontrolled power capacity updating unit 301 is activated by operation items of algorithm which is independent for each subsystem.

An example of algorithm for the uncontrolled power capacity updating unit 301 which estimates the required spare capacity will be explained in detail with reference to the flowchart of FIG. 4.

In this example, first, f (power control flag) is cleared (S401), and m (maximum power displacement) is initialized to zero (S402). Then, the uncontrolled power capacity updating unit 301 acquires the present power demand from the externally provided distribution board, and substitutes the acquired amount for the variable pp (S403). After a certain time has elapsed (S404), the present power demand acquired from the distribution board is substituted for the variable cp (S405).

If f is zero (S406), S409 is executed, and no operation is performed for a certain time. If f is not zero, S407 is executed, and the absolute value of the difference between the variable cp and the variable pp is compared with m. If m is smaller than the absolute value of the difference, S408 is executed to update the required spare capacity. If m is larger than the absolute value of the difference, S409 is executed, and no operation is performed for a certain time since the required spare capacity does not have to be updated.

In S408, the value of m is updated to be the absolute value of the difference between the variable cp and the variable pp, and f is initialized to zero. Then, S409 is executed. In S409, no operation is performed for a certain time regardless of whether the value of m is updated or not. In S410, pp which is the power demand previously obtained from the distribution board is updated to cp which is the latest power demand. Then, S405 is returned to in order to repeat the same operation. With the above process, the operation of an example of algorithm to estimate the required spare capacity is completed.

The required spare capacity for each subsystem can be determined from a maximum value in a history recorded for a certain period, or by using a function of the observed power displacement, the safety factor and an elapsed-time from observation start, instead of by using the observed maximum power displacement. These methods are effective for a load which is rarely imposed or a device with energy-saving functions.

For example, a substantial required spare capacity function in which the safety factor of 1.2 is reduced by ten percent of the displacement every week where $t_e$ represents the elapsed seconds from the time when the measurement is started is used.

The formula is as follows:

$$M(m, t_e) = m \cdot \left(1.2 - 0.1 \cdot \frac{t_e}{604800}\right)$$

Figure 4:
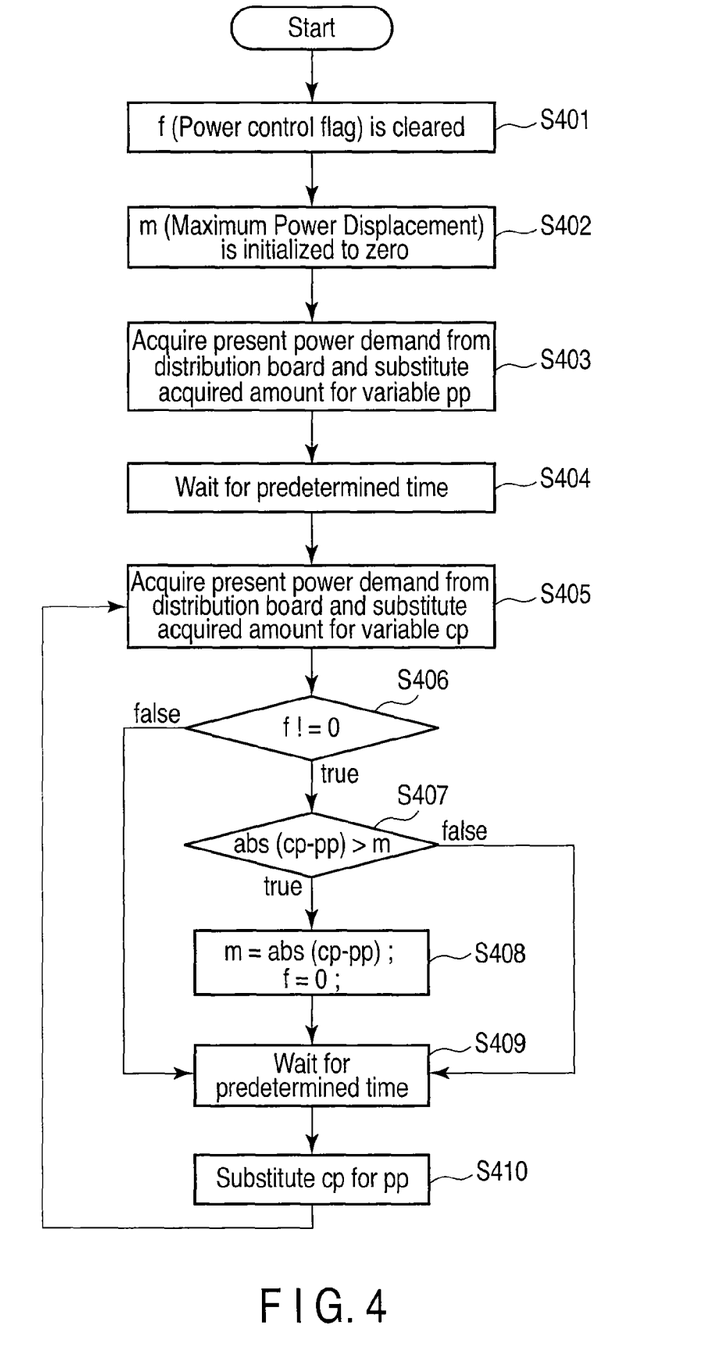
FIG. 4 is an exemplary flowchart illustrating the algorithm of required spare capacity estimation.

The required spare capacity is given by M (m, $t_e$) at any time, and M (m, $t_e$) is compared with the presently observed displacement (cp-pp) in the observed power displacement comparison by the algorithm shown in FIG. 4. If the observed displacement is greater than M, $t_e$ and m are updated and M (m, $t_e$) recalculated.

According to the aforementioned second embodiment, effective demand side control is realized by monitoring the power demand for each subsystem and dynamically updating the required spare capacity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power control apparatus, comprising:
a calculation unit configured to calculate a spare power capacity for each subsystem based on a power demand and a maximum power capacity for each subsystem, and to calculate a total spare power capacity for an entire system based on a power demand for the entire system and a contracted power limit;
a detection unit configured to detect whether a required spare capacity is short, based on the required spare capacity and each subsystem's spare power capacity and the total spare power capacity, the required spare capacity indicating an estimated power demand of an uncontrollable device is available;
a storage unit configured to store a plurality of power control operation items which are to be applied to ensure the required spare capacity in order to prevent the required spare capacities for each subsystem and for the entire system from being short;
a first selection unit configured to select at least one of the plurality of power control operation items if the detection unit detects that the required spare capacity for each subsystem or for the entire system is short; and
an execution unit configured to execute an application operation of at least one of the power control operation items until the required spare capacity becomes available, and to execute a waiting operation of at least one of power control operation items executed the application operation if the required spare capacity is available.

2. The apparatus according to claim 1, wherein the detection unit calculates a power criticality value by subtracting the spare power capacity from the required spare capacity, detects that the required spare capacity is short if the power criticality value is positive, and detects that the required spare capacity is available if the power criticality value is negative.

3. The apparatus according to claim 1, wherein
the storage unit further stores a plurality of power control information items, each of the power control information items includes a first state indicating that power control operation item is applied and is stoppable, a second state indicating that the power control operation item is waiting for application and is applicable, a third state indicating that the power control operation item is inoperable, an application priority indicating priorities for applying the power control operation item, and a waiting priority indicating priorities for waiting application of the power control operation item to resupply power to a device which has been inactivated,
the first selection unit further comprises:
a verification unit configured to determine whether the power control operation item in the second state exists by referring to each of the power control information items if the required spare capacity being short is detected; and
a second selection unit configured to select at least one of power control operation items which is in the second state and has the highest application priority, and
the execution unit configured to execute the application operation of at least one of the selected power control operation items until the detection unit detects that the required spare capacity is available, and to execute the waiting operation of the power control operation items in the first state in order of waiting priority, starting with the highest priority if the required spare capacity becomes available.

4. The apparatus according to claim 1, wherein one of the power control operation items is to disable a power outlet if power has not been supplied to the power outlet for a time which is greater than or equal to a threshold value.

5. The apparatus according to claim 1, wherein one of the power control operation items is to warn a user that the required spare capacity is short.

6. The apparatus according to claim 1, wherein one of the power control operation items is to control power supply relative to a controllable device.

7. The apparatus according to claim 1, wherein one of the power control operation items is to use an external power source.

8. The apparatus according to claim 3, wherein each of the power control information items further indicate a suitable system for each power control operation item, the suitable system indicating which power control operation item in which subsystem is executed, and the execution unit is configured to execute at least one of application operation and waiting operation of the power control operation items for the suitable system by referring to each of the power control information items.

9. The apparatus according to claim 1, further comprising:
a monitoring unit configured to monitor the power demand at an intervals;
a notification unit configured to, if a controllable device is controlled, notify a control report indicating that the controllable device is controlled; and
an updating unit configured to update the required spare capacity to be a difference if no control report is notified and if the difference between the power demand acquired by the monitoring unit and the previously acquired power demand is greater than the required spare capacity, and not to update the required spare capacity if the control report is notified.

10. A power control method, comprising:
calculating a spare power capacity for each subsystem based on a power demand and a maximum power capacity for each subsystem, and calculating a total spare power capacity for an entire system based on a power demand for the entire system and a contracted power limit;
detecting whether a required spare capacity is short, based on the required spare capacity and each subsystem's spare power capacity and the total spare power capacity, the required spare capacity indicating an estimated power demand of an uncontrollable device is available;
storing in a storage unit a plurality of power control operation items which are to be applied to ensure the required spare capacity in order to prevent the required spare capacities for each subsystem and for the entire system from being short;
selecting at least one of the plurality of power control operation items if the required spare capacity for each subsystem or for the entire system is short; and
executing an application operation of at least one of the power control operation items until the required spare capacity becomes available, and executing a waiting operation of at least one of power control operation items executing the application operation if the required spare capacity is available.

* * * * *